Patented May 6, 1952

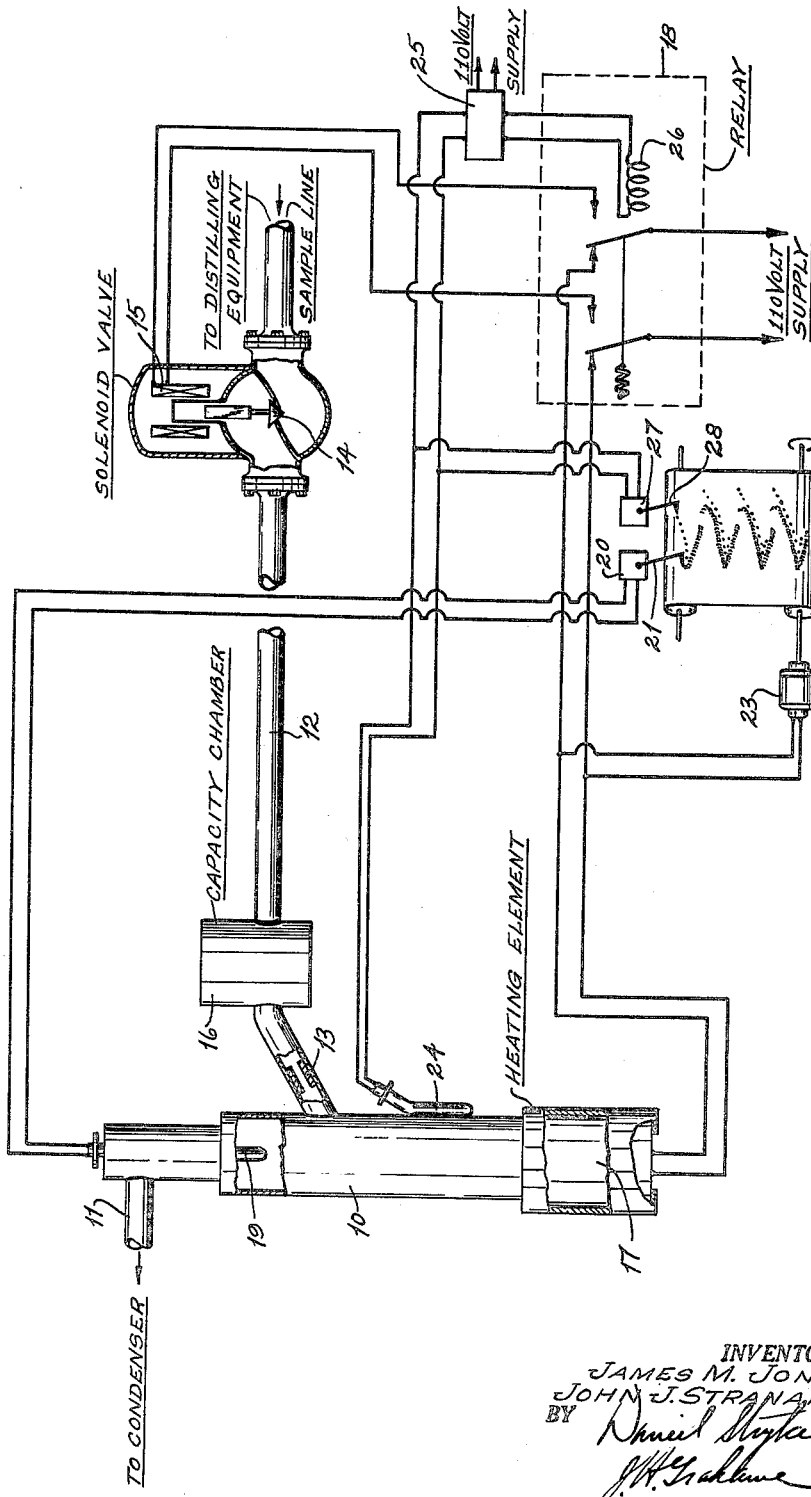

2,595,948

UNITED STATES PATENT OFFICE 2,595,948

AUTOMATIC DISTILLATION TESTING

James M. Jones and John J. Stranahan, Port Arthur, Tex., assignors to The Texas Company, New York, N. Y., a corporation of Delaware Application June 16, 1948, Serial No. 33,418

3 Claims. (Cl. 202—40)

This invention is concerned with the testing of samples taken from distilling operations and contemplates automatic methods and means for testing samples in distilling operations. The invention is especially applicable to the taking of distillation tests for the distillation and fractionation of hydrocarbon oils and is especially adapted for operations in which relatively light products such as gasoline, naphtha and kerosene are produced.

In the industrial practice in the distilling arts it is common to regulate the distillation by means of the distillation test of samples obtained in the distilling operation. In ordinary practice a sample is taken from the equipment, sent to the laboratory where the distillation test is made and the results then reported to the stillman. There is necessarily a considerable lapse of time between the time when the sample is taken and when the stillman is advised of the test and this lapse of time obviously makes control of the distilling operation difficult since the actual conditions in the equipment when the stillman is advised of the test may be considerably different from that obtaining when the sample was drawn. In accordance with the invention, provision is made for taking a sample and testing it in testing apparatus directly connected to the distilling equipment. By means of the invention the sample is subjected to distillation in the test apparatus and after the distillation is completed, the heating of the test still is automatically stopped and a fresh sample is withdrawn from the distilling operation for the distillation test. In this way successive samples may be expeditiously tested and the stillman is kept constantly aware of the conditions in the distilling equipment.

In accordance with the invention, the heating of the test still is continued beyond the point at which the end point of the sample is reached, a temperature is taken at a point in the test still which reflects the resultant increased temperature above the end point temperature and a predetermined temperature point in this higher temperature range is utilized for automatically stopping the heating of the test chamber and admitting another sample for testing.

The invention will be fully understood by reference to the accompanying drawing which is diagrammatic in character and which illustrates a preferred embodiment of the invention.

A testing retort 10 preferably constructed of metal is provided with a vapor line 11 extending to a suitable condenser (not shown). A sampling line 12 serves to withdraw a sample of liquid which it is desired to test and discharge it into the distillation chamber 10. The sampling line communicates with any suitable source of the liquid to be tested, such as a distillate line through which a stream of distillate is running, a distillate receiving drum or tank, a bubble tower tray or the like. The introduction of liquid through the sampling line to the vessel 10 is controlled by a valve 14 operated by a solenoid 15. It is preferable to provide in the sampling line an enlarged chamber 16 constituting an accumulation chamber to assure that an ample sample is taken each time the valve is opened. It is also advantageous to provide a restricted portion 13 in the sampling line directly adjacent the vessel 10 for the purpose of preventing or reducing any gas flashback when the relatively cool sample is introduced into the vessel 10 heated from a previous distillation test. The sampling line preferably enters the distillation vessel at an acute angle, as shown in the drawing.

Heat for the distillation is supplied by a heating element 17. The heating element is adapted to be connected in circuit with a suitable source of electricity through a double-pole, double-throw relay 18. A 110-volt A. C. is well adapted as the source of electric power.

A thermocouple 19 is disposed to indicate the distillation test temperatures and is normally positioned in the vapor space of the vessel 10. The thermocouple is in circuit with a device 20 which converts voltage to pen movement and controls the movement of a pen 21 on a rolling chart 22 in response to temperature changes in the distilling vessel. The chart is operated by a motor 23 which is adapted to be connected in circuit through the relay 18 with the source of electricity. In lieu of the rolling chart 22 a circular rotating chart may be employed.

A second thermocouple 24 is in contact with the wall of the vessel 10, being preferably positioned at some intermediate or lower point of the vessel. It is in a contiguous position to the wall of the vessel so as to register to some degree at least the temperature of the wall and reflect the higher temperature of the vessel above the end point temperature. The thermocouple 24 is preferably in circuit with a device 27 which converts voltage to pen movement and controls the movement of a pen 28 on the chart 22. Thus a continuous indication of the temperatures taken by the thermocouples 19 and 24 is shown on the chart 22. The thermocouples may be self-generating or provided with an extraneous source of power. The thermocouple 24 is in circuit with an amplifying device 25 adapted, upon a given temperature rise, to close a switch to apply power to a solenoid coil 26 of the relay 18. The solenoid coil 26 is energized only upon a predetermined rise in temperature of the thermocouple 24 and is de-energized upon a given drop in temperature.

The solenoid 15 which controls the valve 14 in the sampling line, is adapted to be connected in circuit with the source supply of electricity upon the energizing of the solenoid 26 of the relay 18.

In operation, assuming a sample of distillate to be in the distilling vessel 10 with the valve 14 closed and with the relay contacts closing the circuit to the heating element 17 and to the chart motor 23 (as shown on the drawing), heat is applied to the distillate with resultant vaporization. The vapors pass to the condenser wherein they are condensed. The temperature taken by the thermocouple 19 and indicated on the chart, rises as the distillation proceeds. The temperature continues to rise until the last portion of the liquid is vaporized and the maximum temperature point or end point is reached, after which the temperature as reflected by the thermocouple 19, immediately drops due to the absence of vapor flowing through the vapor line. The application of heat is, however, continued beyond this point and the temperature registered by the thermocouple 24 continues to rise until the predetermined point is reached when the solenoid 26 is energized which functions to throw the double-pole, double-throw relay, breaking the contacts in the heating and motor circuits so as to stop the application of heat by the heating element 17 and stop the motion of the chart 22.

The energizing of the solenoid 26 also serves to close the supply circuit to the solenoid 15, the activation of which serves to open the valve 14 and permit a sample of liquid to flow through the sampling line to the distilling vessel 10. The influx of the relatively cool liquid into the vessel 10 reduces the temperature of the metal wall which is reflected by the thermocouple 24. When the temperature registered by the thermocouple 24 has fallen a predetermined amount, the solenoid 26 is de-energized thus breaking the contacts in the circuit of the solenoid 15 and permitting the valve 14 to close. The contacts in the heating and motor circuits are closed with the result that the heating of the vessel 10 is resumed and the chart 22 is again placed in motion. The distillation of the fresh sample is thereupon conducted.

The temperature of the thermocouple 24 for actuating the relay to open the heating circuit and to actuate the valve in the supply line is selected as any convenient temperature well above any expected fluctuations in the end point temperature and which may be quickly reached upon the continued heating of the test still after the end point is reached. Thus, for example, in testing samples having end points approximating 380° F. an actuating temperature of 460° F. has been used and in testing samples running about 475° F. end point an actuating temperature of about 520° F. was used.

The test still may be readily correlated with any standard distillation test desired such, for example, as the ASTM distillation test.

Although a preferred embodiment of the invention has been described herein, it will be understood that various changes and modifications may be made therein, while securing to a greater or less extent some or all of the benefits of the invention, without departing from the spirit and scope thereof.

We claim:

1. The method of automatically making successive distillation tests of liquid samples withdrawn from a distilling operation that comprises conducting a sample from the distilling operation through a valved supply line to a distillation test still, electrically heating said test still to effect vaporization of the liquid therein, measuring the distillation test temperature with a temperature indicating means at a given point, continuing the application of the heating after the end point of the liquid sample is reached, measuring the temperature of the test still with another temperature indicating means positioned to reflect the increased temperature above said end point temperature due to said continuance of the heating, upon a predetermined increase in temperature of the latter temperature indicating means and through the agency of such indicated increased temperature point automatically opening the heating circuit to stop the heating of the test still and opening the valve in the supply line permitting the introduction of a succeeding liquid sample to the test still with resultant cooling thereof and reduction in temperature of the latter temperature indicating means, and upon a predetermined decrease in temperature of said latter temperature indicating means and through the agency of such indicated decreased temperature point automatically closing the valve in the supply line and closing the heating circuit to resume the heating of the test still.

2. The method of automatically making successive distillation tests of liquid samples withdrawn from a distilling operation that comprises conducting a sample from the distilling operation through a valved supply line to a distillation test still, electrically heating said test still to effect vaporization of the liquid therein, measuring the distillation test temperature with a temperature indicating means at a given point, continuing the application of the heating after the end point of the liquid sample is reached, measuring the temperature of the test still with another temperature indicating means positioned to reflect the increased temperature above said end point temperature due to said continuance of the heating, at a predetermined increased temperature point of the latter temperature indicating means automatically actuating a relay to open the heating circuit and stop the heating of the test still and to open the valve in the supply line permitting the introduction of a succeeding liquid sample to the test still with resultant cooling thereof and reduction in temperature of the latter temperature indicating means and at a predetermined reduced temperature point of the latter temperature indicating means automatically actuating the relay to close the valve in the supply line and close the heating circuit to resume heating of the test still.

3. Apparatus for automatically making successive distillation tests of liquid samples that comprises a distillation test chamber, a sampling line for charging liquid samples to the distillation test chamber, a valve in the sampling line, a solenoid adapted to control said valve to open and close it, a heating element in circuit with a source of electricity and adapted to heat the distillation test chamber, temperature indicating means disposed to indicate the distillation test temperatures, another temperature indicating means disposed to reflect the temperature of a point in the wall of the distillation test chamber, a relay including a solenoid adapted to be actuated at a predetermined temperature point of the latter temperature indicating means above the temperature of the distillation end point to open the heating circuit and actuate the valve-controlling solenoid and to open the valve in the sampling line permitting liquid to flow into the distillation test chamber causing the temperature of the wall of the distillation test chamber to drop and at a predetermined drop in the temperature of said latter temperature indicating means to close the heating circuit to heat the distillation test chamber and to de-energize the valve-controlling solenoid to close the valve in the sampling line.

JAMES M. JONES.
JOHN J. STRANAHAN.

REFERENCES CITED

The following references are of record in the file of this patent:

UNITED STATES PATENTS

| Number | Name | Date |
|---|---|---|
| 1,863,346 | Moore et al. | June 14, 1932 |
| 2,069,490 | Fenske | Feb. 2, 1937 |
| 2,081,601 | Ridgway | May 25, 1937 |
| 2,086,808 | Kallan | July 13, 1937 |
| 2,226,097 | Happel et al. | Dec. 24, 1940 |
| 2,240,952 | Hetzer | May 6, 1941 |
| 2,350,006 | Wolfner | May 30, 1944 |
| 2,366,949 | Woppman | Jan. 9, 1945 |

FOREIGN PATENTS

| Number | Country | Date |
|---|---|---|
| 728,957 | France | Mar. 2, 1931 |